Aug. 20, 1963     D. L. HANSFORD ETAL     3,101,246
RECOVERY AND SEPARATION OF LITHIUM
VALUES FROM SALVAGE SOLUTIONS
Filed Oct. 14, 1960
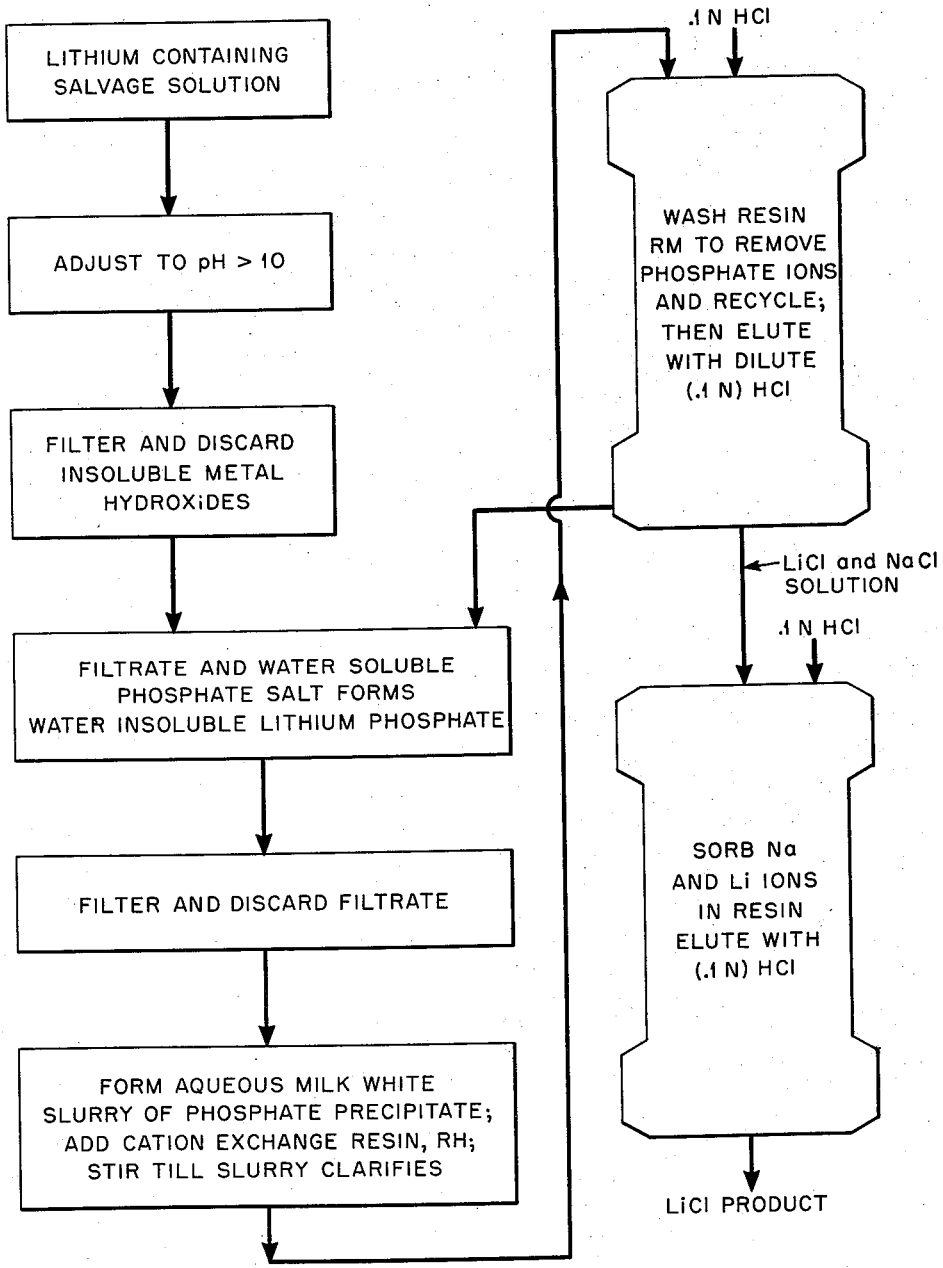
INVENTORS.
David L. Hansford
BY    Edward W. Raabe
ATTORNEY

United States Patent Office 3,101,246
Patented Aug. 20, 1963

3,101,246
RECOVERY AND SEPARATION OF LITHIUM
VALUES FROM SALVAGE SOLUTIONS
David L. Hansford, Houston, Tex., and Edward W.
Raabe, Cincinnati, Ohio, assignors to the United States
of America as represented by the United States Atomic
Energy Commission
Filed Oct. 14, 1960, Ser. No. 62,824
5 Claims. (Cl. 23—25)

The present invention relates to the recovery and separation of lithium values from aqueous solutions containing said values. More particularly it relates to an economical process for concentrating and separating relatively small amounts of lithium values from relatively large amounts of metallic impurities, particularly alkali and alkaline earths, to form a purified lithium salt suitable for the electrolytic production of pure lithium metal.

The main source of pure lithium metal is obtained from the electrolytic reduction of a fused melt containing an inorganic lithium salt. Generally, the electrolytic bath is composed of a eutectic mixture of potassium chloride and lithium chloride. The nature as well as the level of impurities will determine the yield and/or purity of the recovered lithium metal. For example, the presence of even small amounts of alkali and/or alkaline earth metals in the lithium chloride melt can reduce the yield and purity of the final lithium metal product. These impurity metals may be codeposited under the same general electrolytic conditions required to deposit lithium. The codeposition of sodium is particularly harmful as it has a tendency to burn and ignite at the depositing electrode, thereby reducing the over-all efficiency and yield of the desired product. Other metal contaminants have a lesser detrimetal effect in that they may form compounds and/or alloys with the lithium and thus also reduce the yield and purity of the desired lithium metal.

It is thus a first object of the present invention to prepare a pure lithium salt product suitable for use in the electrolytic production of metallic lithium.

There are occasions when it is desirable to recover large amounts of purified lithium from solid and/or liquid salvage compositions. For example, during the processing of lithium metal and its compounds there is usually a small percentage of metal scrap and/or lithium-containing aqueous salvage solutions which accumulate. The aggregate of these salvage compositions can represent a considerable inventory of lithium metal. It would obviously be highly desirable if these wastes could be processed to recover a purified lithium product, particularly in cases where the metal is enriched with respect to the lithium-6 or lithium-7 isotope.

It is, therefore, a second object of this invention to provide an economical process for the quantitative separation and recovery of lithium values from lithium-containing salvage compositions.

Another object of this invention is to provide a method of purifying large amounts of lithium from salvage solutions containing varying amounts of lithium and undesirable metal contaminants.

It is a further object of the present invention to provide an economical method which shall be effective to reduce the metal impurity level of lithium-containing solutions to such a degree that further purification by ion exchange becomes technically and economically feasible.

Other objects will in part be obvious and in part be pointed out in the following description.

In its broad aspect, the method of the present invention comprises the steps of forming an aqueous basic solution from a lithium-containing salvage source, contacting said solution with a water soluble phosphate to form a highly water insoluble lithium alkali phosphate precipitate, forming an aqueous slurry of said precipitate with a strongly acidic cation exchange resin in its hydrogen form to sorb lithium and other cationic values on said resin, and thereafter selectively separating said lithium values from said resin.

Simply stated, the principal advantage of this invention is that it increases an initially low ratio of lithium to impurity metals of a salvage solution to a sufficiently high level so that final purification by an ion exchange process becomes technically and economically feasible. The problem is then essentially reduced to the separation of lithium from alkali metals, principally sodium. Separation of these two metals by an ion exchange process depends upon the differences in mobilities of their ions as they pass in contact with and through a mass of a cation exchange resin. For a given system consisting of an electrolyte containing these ions and a cation exchange resin in its hydrogen form in contact with the electrolyte, the ratio of sodium to lithium mobilities is equal to the ratio of sodium to lithium ion distribution between the electrolyte and the resin phase. The conditions which permit the greatest ratio of sodium to lithium distribution between the resin and the electrolyte are best for separation of lithium from an ion exchange column containing these ions sorbed thereon.

The distribution of a metal ion, M, in an electrolyte-resin system is determined by measuring the distribution coefficient $K_M$, which is defined as follows:

$$K_M = \frac{M_T - M_L V}{M_L w}$$

where:

$K_M$ = distribution coefficient for metal ion M;
$M_T$ = initial quantity of M;
$M_L$ = quantity of M in electrolytic phase, at equilibrium;
$V$ = volume of electrolytic phase; and
$w$ = weight of dry resin.

The ratio of distribution coefficients of lithium to sodium is called the "separation factor." Since ion exchange separation occurs because of the differences in rates of mobility of the ions, a resin bed or column must have sufficient height to allow the faster moving ions enough time to effect separation. An estimate of this height can be obtained by referring to the separation factor. For example, a lithium to sodium separation factor of 2 means that, in general, the total length of a resin bed or column should be at least twice as long as the column length required for absorption of the ions.

The dimensions of an ion exchange system are also determined by the capacity of the resin used. Cation exchange capacity is measured by equivalents. That is to say, for every gram equivalent weight of cations taken up by the solid exchange resin, one gram equivalent of cations must be released.

Ion exchange separations provide many unique advantages in separating, concentrating and purifying metals in dilute solution and the principles outlined above can be readily adapted to the separation of lithium and sodium. In actual practice, however, where the lithium exists in solution together with a large amount of alkali, alkaline earth and other metal cations, many complicating variables are introduced. In this connection it should be understood that the capacity of cation exchange resins is relatively low for most metal cations. Secondly, the separation factor, $K_M/K_{Li}$ (where M is a metal cation other than lithium), is relatively high for most metal cations. These facts, taken together, mean that before lithium can be separated from a solution containing large amounts of other cation impurities, these impurities must first be sorbed on the resin. It further signifies that separation of lithium from a salvage composition containing a relatively large concentration of contaminating metal values solely by an ion exchange process would be a technically cumbersome operation, since, among other difficulties, the throughput of lithium would be decreased considerably. Furthermore, salvage solutions vary in their lithium and metal impurity content. In some cases the ratio of lithium to metal impurity is extremely low; in other cases the ratio may be higher, but the nature of the impurity may present a particularly difficult separation problem. It would be extremely difficult to operate an efficient ion exchange system where the lithium content can vary over a wide range.

The present invention overcomes these problems by removing a major portion of metal impurities from a lithium-bearing solution prior to recourse to an ion exchange process for achieving final purification. Specifically, the present invention includes the steps of contacting an alkaline solution containing lithium values, alkali and alkaline earth and other metal cations with a soluble phosphate salt such as tribasic potassium phosphate to convert the lithium to a water insoluble alkali phosphate, forming an aqueous slurry containing said precipitate and a strongly acidic cation exchange resin in its hydrogen form to thereby sorb said lithium and other metal values on said resin and thereafter selectively separating a purified lithium product from said resin. Thus, by the practice of this invention, a lithium-containing composition is obtained which has a relatively high and constant ratio of lithium to metal impurity so that purification by ion exchange procedures is facilitated.

A unique feature of the present invention is the solid-solid contact of the lithium alkali phosphate and the solid resin to effect ion exchange. It has previously been understood that for efficient ion exchange to take place, a solution containing cations is contacted with a solid cation exchanger. Yet, by some incompletely understood mechanism, cation exchange takes place by a solid-solid reaction between the lithium alkali phosphate and the solid resin. It has been observed that upon addition of the solid cation exchange resin to an aqueous slurry of the lithium alkali phosphate precipitate, the original milky white appearance of the slurry gradually disappears until finally the water is clarified. This suggests that the resin breaks down the water insoluble phosphate in accordance with the following equation:

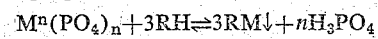

where M is a metal cation such as Li, Na, etc.; RH is a cation exchange resin in its hydrogen form; and $n$ is the valence state of M.

It will be noted that reference has been made to a lithium alkali phosphate precipitate. Actually, the empirical structure of this precipitate is uncertain. It is thought that the phosphate precipitate contains alkali, as well as alkaline earth metals, in varying amounts. Evidence for this is provided by the fact that soluble alkali values such as sodium and potassium cannot be completely removed even after extensive water washing of the water insoluble lithium phosphate, indicating that these values are chemically bound. In any event, formation of the lithium alkali phosphate precipitate increases the ratio of lithium to alkali and alkaline earths, as well as other metal impurities, to the point where final separation and purification of the desired lithium product may proceed by an ion exchange process, the principles of which have been previously referred to.

A representative example of the application of our invention will now be described as carried out upon a lithium-containing solution which is heavily loaded with alkali metal, alkaline earth and other metal impurities and with reference to the accompanying drawing which is a diagrammatic flow sheet illustrating the salient process operations of the invention. Unless otherwise indicated, all operations were conducted at or near room temperature.

*Example*

A number of lithium salvage sources were combined to form 418 liters of an aqueous solution. This solution contained 2090 grams of lithium, about 105 grams each of sodium and potassium, about 10 grams of calcium, and also included aluminum (400 parts to a million parts of lithium), barium (900 p.p.m.), iron (200 p.p.m.), magnesium (125 p.p.m.), molybdenum (300 p.p.m.), vanadium (900 p.p.m.), zinc (about 1000 p.p.m.), and tin (700 p.p.m.).

To this solution was added potassium hydroxide to adjust the pH to a basicity high enough so as to insure that insoluble metal hydroxides which form will be completely precipitated. A pH of at least about 10 is sufficient for this purpose. Among the metal hydroxides which precipitated were iron, aluminum, ferric, chromic and nickel hydroxides. The solution was filtered to remove the insoluble hydroxides which were discarded. The aqueous filtrate which contained lithium hydroxide, alkali, and alkaline earth hydroxides dissolved therein was then passed to a tank where an aqueous solution of tribasic potassium phosphate was introduced, with constant agitation to insure uniform mixing. The amount of phosphate added was approximately 25 percent in excess of the stoichiometric amount required to completely precipitate the lithium as an insoluble phosphate. As the tribasic potassium phosphate was added to the solution, a white, fine precipitate formed. This precipitate is the lithium alkali phosphate previously referred to. The precipitate was digested for about 15 minutes at a temperature in the range 40° C. to 95° C. to insure complete precipitation of lithium. The solution containing the phosphate precipitate was then cooled to room temperature and filtered such as in a vacuum gravity filter. The filtrate was discarded and the precipitate then introduced into an absorption tank. The phosphate precipitate contained 2088 grams of lithium, about 19 grams of sodium, about 200 grams of potassium, and less than 0.08 gram of calcium.

In the absorption tank, the phosphate precipitate was mixed with about 20 gallons of water to form a milky white emulsion. To this emulsion was added 200 pounds of Dowex-50. Dowex-50 is a water-insoluble resin containing a plurality of sulphonic acid groups, said groups being attached to a cross-linked polymerizate of a polyvinyl aryl monomer. The resin had an ion exchange capacity of 4.5 mil equivalents per gram of dry resin and had a particle size in the range 50 to 100 mesh. After addition of the resin, it was noted that the suspended phosphate precipitate began to disintegrate and the milky white appearance of the slurry began to clarify. After the full amount of Dowex-50 was added, the slurry was completely clarified, indicating complete breakdown of the lithium alkali phosphate and absorption of lithium and other ion impurities on the resin. During ion sorption on the resin a small amount of lithium remained in the filtrate apparently due to its solubility in the phosphoric acid formed, as shown in Equation 1. The resin slurry and filtrate was then pumped into the absorption section of a two-section ion exchange system. In the absorption section of the ion exchange system, the resin column was washed with water until the eluate water had a pH in the range 6–7, indicating substantially complete removal of the phosphoric acid from the void volume of the resin. The filtrate from the absorption tank and the water washings were collected and recycled to the precipitation tank where the lithium could be reprecipitated by adjusting to a pH in the range 10–12 (by the addition of KOH, as before). In this way, any lithium in solution can be recovered while the phosphate ions are recycled to effect precipitation of lithium. The absorption section was then washed with an aqueous eluting solution of about 1 N in HCl. The cations in the eluate consisted almost entirely of lithium ions and small amounts of sodium, potassium and calcium. This eluate solution was then allowed to percolate through the separation section of the ion exchange system. Since lithium showed the least tendency to be sorbed on the resin, it was the first to be removed therefrom. For this purpose, an eluting solution about .1 N in HCl was used to collect an eluate of substantially pure lithium chloride. To avoid excessive sodium contamination, the eluting solution should not exceed 1 N HCl. A dilute solution of sulfuric acid (about 1 N) may also be used to remove the lithium ions from the resin in cases where it is desired to recover the lithium as the sulphate salt. After all the lithium was eluted from the resin, the absorption and separation sections of the ion exchange system were regenerated by flowing a solution of 4 normal hydrochloric acid to convert the resin to its hydrogen form. To prepare the resin for reuse, it should then be water washed to a pH in the range 6–7.

The lithium chloride product was analyzed and found to contain 2073 grams of lithium, 0.75 gram sodium and less than 0.08 gram each of potassium and calcium. This represents a 98.5 percent recovery of lithium. It will thus be seen that substantially complete recovery of the lithium has beeen achieved while reducing the sodium content to less than 0.04 percent and the potassium level and calcium to less than 0.004 percent. The lithium chloride product is of sufficiently high purity to be used in the electrolytic production of lithium metal.

By the practice of this invention it is now possible to obtain a standardized ion exchange process for purifying lithium-containing compositions having a lithium to impurity ratio varying over a wide range. As has been demonstrated the formation of a basic salvage solution containing lithium, removes insoluble metal hydroxides; the addition of phosphate ions results in the formation of a highly insoluble lithium alkali phosphate product to increase the lithium to metal impurity ratio to a high level; and finally the unique solid-solid contact between the phosphate product and the cation exchange resin permits final purification to proceed by ion exchange. Substantially complete recovery of the initial lithium content in a highly purified form proceeds by elution from the resin as has been shown.

It should be noted that the function of the ion exchange resin in this invention is two-fold. In the first place, the resin effects final purification of the lithium phosphate precipitate. Secondly, it converts the solid insoluble lithium phosphate salt to a water soluble salt such as lithium chloride. In cases where sufficient purification has been achieved by formation of the insoluble lithium salt, then it may be sorbed on the resin and then separated therefrom as a water soluble salt without controlling the pH of the eluting solution.

It should be understood that the above description should be construed as illustrative only, since many embodiments of this invention may be made without departing from the spirit or the scope thereof. For example, other cation exchange resins in which lithium has the least absorptive capacity as compared to other cations present, may also be used in place of Dowex-50. Also, water soluble phosphate salts other than tribasic potassium phosphate may be used to form an insoluble lithium phosphate product.

Having thus described our invention, we claim:

1. A method for the recovery of lithium from an aqueous lithium-containing solution containing other cationic impurities, which comprises adjusting the concentration of said solution to a basic value of at least approximately pH 10 with a metal hydroxide to precipitate certain of said cationic impurities as insoluble hydroxides, separating the resulting lithium-containing supernatant solution from the resulting hydroxide precipitate, contacting the separated supernatant solution with a soluble phosphate salt to form an insoluble lithium phosphate salt, separating the resulting lithium phosphate precipitate from the resulting supernatant solution, forming an aqueous slurry of the separated lithium phosphate precipitate, contacting the resulting slurry with a comminuted organic cation exchange resin in the acid form until said slurry has been clarified, separating the resulting lithium-containing resin from the resulting solution, and recovering the lithium from the contacted resin.

2. The method according to claim 1 wherein the soluble phosphate salt is tribasic potassium phosphate.

3. In a method of recovering and purifying lithium values from an aqueous basic solution, the steps which comprise contacting said solution with a water-soluble metal phosphate to form a water-insoluble lithium phosphate, the amount of said soluble phosphate being in excess of the stoichiometric amount required to precipitate said lithium values, forming an aqueous slurry of said lithium phosphate, and contacting said slurry with a comminuted organic cation exchange resin in the acid form until said slurry has been clarified to thereby sorb said lithium on said resin, and thereafter separating said lithium from said resin.

4. The method according to claim 3 wherein the water-soluble metal phosphate is a potassium phosphate.

5. A method for the recovery of lithium values from an aqueous basic solution which comprises reacting said values with a phosphate salt soluble in said solution, forming an aqueous slurry of the resultant aqueous insoluble lithium phosphate, contacting said slurry with an organic cation exchange resin in the acid form until said slurry has been clarified, and thereafter recovering lithium values from said resin.

References Cited in the file of this patent

UNITED STATES PATENTS

| 1,544,114 | Weidmann | June 30, 1925 |
| 2,964,381 | Goodenough | Dec. 13, 1960 |
| 2,977,185 | Goodenough | Mar. 28, 1961 |
| 2,980,498 | Wheaton | Apr. 18, 1961 |

FOREIGN PATENTS

| 568,364 | Canada | Dec. 30, 1958 |

OTHER REFERENCES

Hader et al., "Industrial and Engineering Chemistry," vol. 43, No. 12, December 1951, pages 2636 and 2646.